D. P. KELLOGG.
COMPOSITE DRILL AND METHOD OF MAKING SAME.
APPLICATION FILED MAR. 30, 1917.

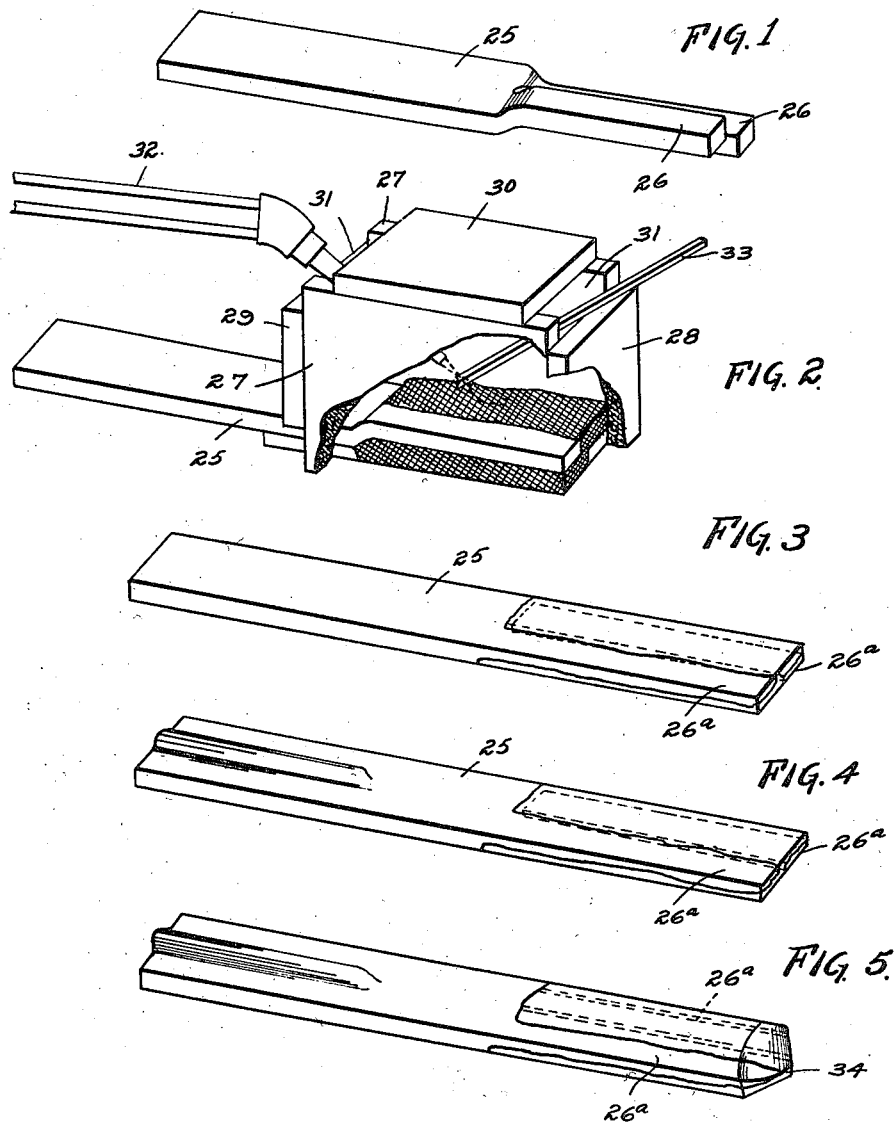

1,323,988.

Patented Dec. 2, 1919.
2 SHEETS—SHEET 2.

INVENTOR
Daniel P. Kellogg
BY
Barnett & Truman
ATTORNEYS.

UNITED STATES PATENT OFFICE.

DANIEL P. KELLOGG, OF LOS ANGELES, CALIFORNIA.

COMPOSITE DRILL AND METHOD OF MAKING SAME.

1,323,988.           Specification of Letters Patent.        Patented Dec. 2, 1919.

Application filed March 30, 1917. Serial No. 158,597.

*To all whom it may concern:*

Be it known that I, DANIEL P. KELLOGG, a citizen of the United States, residing at Los Angeles, in the county of Los Angeles and State of California, have invented certain new and useful Improvements in Composite Drills and Methods of Making Same, of which the following is a specification.

My invention relates to drills and its object is to provide a drilling tool which is composed for the most part of relatively soft metal, preferably steel, but with its cutting edges formed of harder metal, preferably of one of the alloys variously known as "high speed" or "self-hardening" or "air-hardening" steel.

A composite drilling tool of this sort, provided it can be made economically and a satisfactory weld obtained between the high speed steel and the common steel, has the advantage of economy in material over a drill made entirely of high speed steel, this product being very expensive.

Besides this, the ordinary low carbon steel is much tougher. A tool made largely of common steel, with its cutting edge only of the high speed alloy, will much better withstand the torsional and other stress to which the drill is subjected.

The method of welding the high speed steel edging or facing to the common steel stock is in general the same as the welding method described and generically claimed in the co-pending joint application of myself and others, Ser. No. 57,767, filed October 25, 1915, and my co-pending application Serial No. 158,595, filed March 30, 1917. The invention of the present application has to do with the adaptation of this method to the problem of manufacturing tools such as drills.

The drawings annexed hereto illustrate the method as applied to the manufacture of a flat track drill and also to the manufacture of a twist drill.

Figure 1 is a view in perspective of the blank from which the body or stock of the drill is made.

Fig. 2 is a similar view, with parts broken away, showing the method of uniting the high speed steel to the soft steel blank.

Figs. 3, 4 and 5 are perspective views illustrating the development of the tool from the composite welded blank to the finished device which is shown in Fig. 5.

Figure 11:
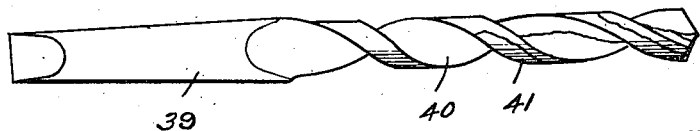

Figs. 6 to 10 inclusive are perspective views illustrating the development of the twist drill, and Fig. 11 is a side view of the finished twist drill.

Like characters of reference indicate like parts in the several figures of the drawings.

In making the flat truck drill shown in its finished form in Fig. 5, a blank of soft steel or other suitable metal 25 is slit at one end and the prongs 26 formed by the slit are off-set so that they stand in diagonal relation to each other.

The blank is then inclosed in a furnace or retort formed preferably of blocks or bricks of refractory material of the sort described in my co-pending application referred to. The side blocks 27, 27 lie up close against the prongs 26 of the blank. The outer end block 28 lies against the ends of the prongs. Block 29 closes the other end of the retort and a cover block 30 is placed on the side blocks 27, leaving apertures 31, 31 at opposite ends of the furnace. Obviously, the construction of the retort or furnace might be varied without departure from my invention.

The welding operation is preferably accomplished by means of an oxy-acetylene flame or other high temperature flame of the oxy-acetylene type. The torch 32 is thrust into one of the openings 31 in the top of the retort and manipulated to melt the exposed surfaces of the prongs 26.

A piece of high speed steel 33 is then thrust into the opening 31 and the end of it melted and flowed below the upper prong and above the lower prong, as shown in Fig. 2.

The fusion of the metals preferably is accomplished under conditions which exclude air from contact with the molten metal. This results from building a furnace or retort around the work. A flame chamber is thereby provided which is substantially filled with the flame from the torch so that the outside air cannot come into contact with the metal while it is in molten condition. In some cases the operation will be performed in the open air, when the surfaces are likely to swell and become blistered, which spoils the article for the purposes for which it is intended to be used. It is also a matter of considerable importance to withdraw the torch somewhat gradually so that the metal has a chance to cool before the air can come into contact with it. I prefer also, for the same reason, to dash a small amount of pulverized charcoal, coal or coke or other suitable finely divided material over the metal as the torch is withdrawn from the furnace. In the manipulation of the torch care should be taken not to play the flame directly against the metal surfaces to be melted, particularly the high speed steel, as this is likely to oxidize the metal. Both the stock and the high speed steel weld stick are desirably pre-heated, for example, in an ordinary forging furnace, before they are subjected to the high temperature of the oxyacetylene flame. By taking these various precautions, all of which may not be necessary under all circumstances, it is possible to maintain the high speed steel in its original condition of purity and to unite the same by a permanent weld to the stock.

After the welding operation is complete and the article is cooled to a forging temperature (or it may be allowed to cool completely and then reheated), it is hammered or rolled to the shape shown in Fig. 3. This treatment of the metal improves its character and the character of the weld between the bodies of steel which are united together. The tool is then dressed and shaped as shown in Figs. 4 and 5. The finished tool (Fig. 5) is provided with a relatively thin body of high speed steel 34, which forms the point and cutting edges of the drill. The high speed steel is reinforced by backings 26ª of softer, tougher steel which strengthen the cutting portion of the drill against the torsional stress to which the tool is subjected in service.

Figure 6:
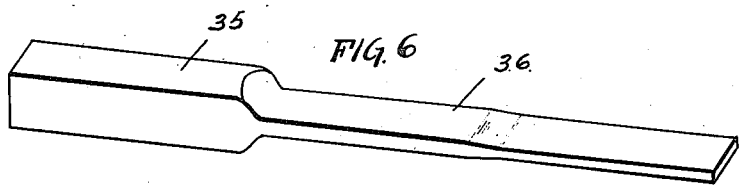
Figure 7:
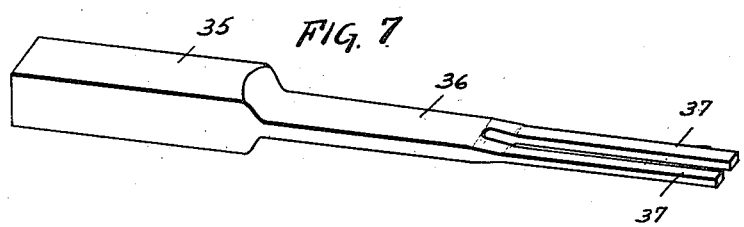
Figure 8:
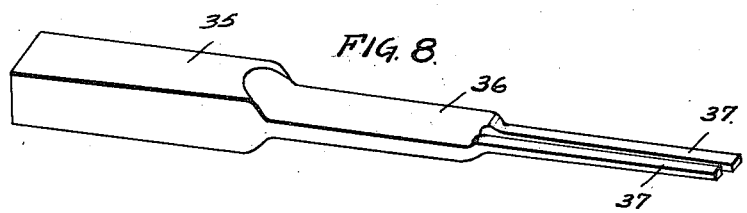
Figure 9:
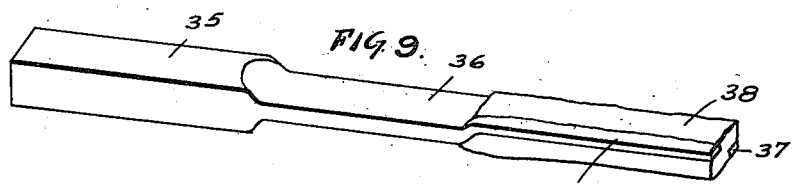
Figure 10:
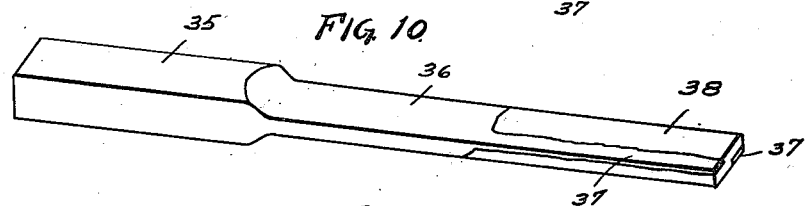

Fig. 11 shows a twist drill made in accordance with the same general method. The blank 35 is flattened as indicated at 36 (Fig. 6), slotted to provide prongs 37 (Fig. 7) and the prongs off-set, as shown in Fig. 8. The high speed steel 38 is flowed into the space between the prongs and above one and below the other, as shown in Fig. 9. The blank is then thinned down (Fig. 10), pointed and dressed and then twisted, as shown in Fig. 11. The finished drill consists of a properly shaped shank 39 and a twisted drill portion 40 of soft steel, the latter being formed with helical facings 41 of high speed steel which provide the cutting edges of the drill. The soft steel of the drill portion of the tool forms in effect helical backings for the relatively brittle high speed steel which provide the cutting edges.

I claim:

1. A composite twist drill consisting of an integral welded structure made up of a flat shank of relatively soft metal, a twisted body of high speed steel providing the cutting edges of the drill, and helical soft metal backings along the opposite edges and on opposite sides of the body of high speed steel.

2. The method of making a composite drilling tool composed largely of relatively soft metal provided with high speed steel cutting edges which consists in forming the soft metal stock with a pair of diagonally disposed prongs, welding the high speed steel between and to said prongs by fusing the surfaces of the prongs and melting the high speed steel little by little by means of a high temperature gas flame, and flowing it upon said fused surfaces, flattening the welded part of the article by hammering, rolling and dressing the same to the desired shape.

3. The method of making a composite drilling tool, composed largely of relatively soft metal provided with high speed steel cutting edges, which consists in forming the soft metal stock with a pair of diagonally disposed prongs, melting the high speed steel and the surfaces of the prongs and flowing the high speed steel between and along the prongs under conditions which exclude the air from the molten metal, and dressing the article to the desired shape.

4. The method of making a composite drilling tool composed largely of relatively soft metal provided with high speed steel cutting edges, which consists in slitting a soft metal blank and off-setting the slitted ends to provide diagonally disposed prongs, welding the high speed steel between and to said prongs and dressing the tool to the desired shape.

5. The method of making a composite drilling tool composed largely of relatively soft metal provided with high speed steel cutting edges, which consists in slitting a soft metal blank and off-setting the slitted ends to provide diagonally disposed prongs, melting the high speed steel and the surfaces of the prongs and flowing the high speed steel between and along the prongs under conditions which exclude air from the molten metal, and dressing the tool to the desired shape.

6. The method of making a composite drilling tool composed largely of relatively soft metal provided with high speed steel cutting edges, which consists in slitting a soft metal blank and off-setting the slitted ends to provide diagonally disposed prongs, melting the high speed steel and the surfaces of the prongs and flowing the high speed steel between and along the prongs under conditions which exclude air from the molten metal, flattening the welded end of the blank by rolling or hammering, and dressing the same to the desired shape.

7. The method of making a composite drilling tool composed largely of relatively soft metal provided with high speed steel cutting edges, which consists in forming a soft metal blank with a pair of diagonally disposed prongs, placing the prongs in a retort which incloses the spaces above one of the prongs and below the other, melting the high speed steel and the surfaces of the prongs and flowing the high speed steel between and along the prongs and dressing the tool to the desired shape.

8. The method of making a composite drilling tool composed largely of relatively soft metal provided with high speed steel cutting edges, which consists in forming a soft metal blank with a pair of diagonally disposed prongs, placing the prongs in a retort which incloses the spaces above one of the prongs and below the other, melting the high speed steel and the surfaces of the prongs and flowing the high speed steel between and along the prongs, flattening the welded end of the blank by rolling and hammering, and dressing the same to the desired shape.

9. The method of making a composite drilling tool, composed largely of relatively soft metal provided with high speed steel cutting edges, which consists in forming the soft metal stock with a pair of diagonally disposed prongs uniting the high speed steel with said soft metal stock by welding the said high speed steel between and to said prongs and twisting the welded end of the blank so that the cutting edges are helical.

10. The method of making a composite drilling tool composed largely of relatively soft metal provided with high speed steel cutting edges, which consists in forming the soft metal stock with a pair of diagonally disposed prongs, uniting the high speed steel with a relatively soft metal by welding the said high speed steel between and to said prongs, and twisting the welded end of the blank so that the cutting edges are helical.

11. The method of making a composite drilling tool, composed largely of relatively soft metal provided with high speed steel cutting edges, which consists in forming the soft metal stock with a pair of diagonally disposed prongs, melting the high speed steel and the surfaces of the prongs and flowing the high speed steel between and along the prongs under conditions which exclude the air from the molten metal, and twisting the welded end of the blank so that the cutting edges are helical.

12. The method of making a composite drilling tool composed largely of relatively soft metal provided with high speed steel cutting edges, which consists in slitting a soft metal blank and off-setting the slitted ends to provide diagonally disposed prongs, melting the high speed steel and the surfaces of the prongs and flowing the high speed steel between and along the prongs under conditions which exclude air from the molten metal, flattening the welded end of the blank by rolling or hammering, and twisting the welded end of the blank so that the cutting edges are helical.

13. The method of making a composite drilling tool composed largely of relatively soft metal provided with high speed steel cutting edges, which consists in forming a soft metal blank with a pair of diagonally disposed prongs, placing the prongs in a retort which incloses the spaces above one of the prongs and below the other, melting the high speed steel and the surfaces of the prongs and flowing the high speed steel between and along the prongs, flattening the welded end of the blank by rolling and hammering, and twisting the welded end of the blank so that the cutting edges are helical.

14. The method of making a composite drilling tool, composed largely of relatively soft metal provided with high speed steel cutting edges which consists in forming the soft metal stock with a pair of diagonally disposed prongs, fusing the surfaces of the prongs and melting the high speed steel little by little by means of a high temperature gas flame, flowing it upon said fused surfaces so as to build up a body of high speed steel around the prongs, and then dressing the article to the desired shape.

DANIEL P. KELLOGG.